United States Patent Office 3,270,497
Patented Sept. 6, 1966

3,270,497
ANTI-ICING ADDITIVES FOR HYDRO-CARBON FUELS
Emil A. Malick, Bartlesville, Okla., assignor to Phillips Petroleum Company, a corporation of Delaware
No Drawing. Filed Jan. 18, 1962, Ser. No. 167,178
8 Claims. (Cl. 60—35.4)

This invention relates to anti-icing additives for hydrocarbon fuels. In one aspect this invention relates to a liquid hydrocarbon fuel having an anti-icing additive incorporated therein. In another aspect this invention relates to a method for operating a continuous combustion type power plant using said hydrocarbon fuel.

The fuel control systems of modern jet engine aircraft are very complex units which are provided with working surfaces having extremely close tolerances. This is particularly true of the large multi-engine aircraft such as inter-continental bombers and large commercial airliners. The extremely close tolerances of the working surfaces in said fuel control units cause said units to be subject to fouling by deposits caused by or resulting from the presence of contaminants in the fuel. Said deposits cause malfunctioning of said fuel control units and thus create serious problems in the operation of the aircraft. Erratic behavior of said fuel control units, which causes the power output of the engine to vary, has been repeatedly found to be due to the presence of said deposits.

It has been found that four major sources of contamination of a liquid hydrocarbon jet engine fuel are (a) water, which results in ice formation when the fuel is chilled, particularly at the low temperatures encountered at the high altitudes at which said aircraft operate, (b) iron and other metal contaminants in various forms such as the oxide, etc., (c) gums and/or resins resulting from oxidation or other deteriorative reactions of certain hydrocarbons such as olefins, diolefins, or others in the hydrocarbon fuel, and (d) chemical contamination by such chemicals as will impart either basic or acidic characteristics to the hydrocarbon fuel and the water phase usually associated therewith in the fuel tanks. All of said contaminants are usually present to some degree, at least, in nearly all present-day jet fuels, and the presence of each aggravates the effect of the others.

The presence of water and the formation of ice within the fuel system of a jet aircraft has been recognized as a problem for a long time. Flights at high altitudes for long durations often result in the fuel being chilled to temperatures approaching that of the air in which the aircraft is operating. All jet fuel contains small amounts of dissolved and/or entrained water. When the fuel is chilled, the water separates from the fuel and ice may be formed. Ice formation in an aircraft fuel system at points of restricted flow such as filters, screens, valves, orifices, etc., is a serious matter because the engine fuel supply may be restricted and certain instruments may not respond correctly. A number of engine flame-outs have been attributed to ice formation in the fuel system. This problem, per se, has been solved by the development of an outstanding anti-icing agent comprising a blend in synergistic proportions of a glycol ether and a saturated acyclic polyhydroxy alcohol, discussed further hereinafter, and disclosed and claimed in copending application Serial No. 146,443, filed October 20, 1961, by J. A. Shotton, now U.S. Patent No. 3,032,971.

The presence of metal contaminants, or at least the seriousness of the problem posed by the presence of such contaminants, has been recognized only comparatively recently. Iron compounds are the most common offenders in this class of contaminants. Iron is most commonly present in the form of ferric oxide in particles which are less than 10 microns in diameter, more usually from 2 to 5 microns in diameter. Said iron compounds are found in a big majority of jet fuels and it is generally accepted that they enter the fuel either during the manufacturing process or during storage and handling in rusty tanks, rusty pipe lines, etc. Suspended water "droplets" in the fuel concentrate the particles of iron contaminants in said droplets by a "water washing" action. Cooling of a fuel containing dissolved water will result in precipitation of water droplets which then exert a water washing action on the fuel resulting in concentration of the iron oxide particles. Conventional ground equipment such as the filters, etc. normally employed in handling hydrocarbon jet fuels will not remove particles of 5 microns or less diameter.

Under some circumstances some hydrocarbons in the fuel, such as olefins, diolefins, or others, can and do form undesirable gums or other products of reaction resulting from oxidation and/or polymerization. These products tend to drop out of the fuel and deposit on various parts of the fuel system, particularly in the fuel control units where the close tolerances referred to above cause their deposition to be rapidly noticed Said gums or reaction products are usually "sticky" and tend to attract iron or iron oxide particles, or other finely divided particles, present in the fuel or the water phase and concentrate said particles in an undesirable manner.

Chemical contamination can and does result from residues which remain in the fuel as a result of various processing steps during its refining, such as acid treating and caustic washing. It has long been recognized that gross contamination by chemicals could not be tolerated. It is generally recognized that the fuel must be sufficiently near the point of neutrality (pH=7.0) to avoid corrosion of the fuel system. However, it has not been heretofore recognized that a fuel which is sufficiently near the point of neutrality to avoid corrosion problems can still contain sufficient "excess" hydrogen or hydroxyl ions to present a serious problem with respect to fouling of the fuel control units in a modern-day jet aircraft. Said "excess" hydrogen or hydroxyl ions are usually present in very small amounts. However, when a relatively small quantity of water repeatedly contacts successive relatively large quantities of fuel, such as occurs in the filling and emptying of ground storage tanks or the fuel tanks on an aircraft, the concentration of the hydrogen or hydroxyl ions in said small volume of water can build up sufficiently to present serious problems.

The presence of hydroxyl ions in an amount sufficient to increase the pH of the water phase usually associated with the fuel in tanks appreciably above 7 has been found to be particularly deleterious. Due to contacting of the fuel and said water phase during pumping or during flight some of the water phase almost invariably is suspended in the fuel. Under alkaline conditions any iron which is present in the fuel in the ferrous state will be converted to ferrous hydroxide which will tend to separate or drop out of the fuel. In the presence of oxygen this ferrous hydroxide will be converted to ferric hydroxide. Similarly, if the iron is dissolved or otherwise present in the ferric state, the creation of an alkaline condition will cause said iron to drop out as ferric hydroxide quite rapidly. Said ferric hydroxide is a somewhat gelatinous substance which is easily recognizable and has been seen to occur on numerous occasions in the fuel control metering units of various jet engine aircraft.

In U.S. Patent 2,952,121 issued September 13, 1960 to B. Mitacek, the effectiveness of certain glycol ethers as anti-icing agents in jet engine fuels is disclosed and claimed in a method for operating jet engines. Said glycol ethers there disclosed as anti-icing additives are included in the group of glycol ethers which can be used in the combination glycol ether-polyhydroxy alcohol anti-icing additives described above and elsewhere herein. However, as shown by data given hereinafter, said glycol ethers when used per se as an anti-icing additive are not equivalent as anti-icing additives to said combination glycol ether-polyhydroxy alcohol anti-icing additives.

Said anti-icing additives, and particularly said combination glycol ether-polyhydroxy anti-icing additives, have given outstanding results in widespread use. However, for best results under all conditions and with all types of fuel it is desirable to insure that the anti-icing additive itself does not contribute to the basicity or acidity of the fuel blend containing same or the water phase usually associated with said fuel blend. With the glycol ether additives it sometimes happens, due to the presence of contamination with side reaction products or catalyst residues from the manufacturing step, said ethers will have a pH outside the range of 6 to 7. Also, due to the ether linkage, there is a tendency for said ethers to deteriorate on prolonged storage with the formation of peroxides and other impurities which affect the pH and which are difficult to remove. It also sometimes happens that one or both of the components of said combination anti-icing additive, more often the glycol ether, is either sufficiently basic, or acidic, in character to render the entire additive basic or acidic, as the case may be. On ocassion, pH values between 9 and 10 have been observed on the combination additive blend. On other occasions the combination additive blend has been observed to have a pH between 4 and 5. Acid conditions have been observed to develop on prolonged storage in contact with steel at temperatures of 110° F. In all such instances, in accordance with the present invention, it is desirable to essentially neutralize the anti-icing additive, or the offending component, so that it has a pH within the range of 6 to 7. Said neutralization of the anti-icing additive, or the offending component, can be accomplished in any suitable manner. I have found that by thus neutralizing said anti-icing additives that the pH of the water phase usually associated with the hydrocarbon can be maintained within the range of 6 to 7 and the above-described difficulties eliminated.

Thus, broadly speaking, the present invention resides in (1) a neutralized anti-icing additive having a pH within the range of 6 to 7; (2) a liquid hydrocarbon fuel having a small but effective amount of said neutralized anti-icing additive incorporated therein; and (3) a method of operating a jet engine using said liquid hydrocarbon fuel.

An object of this invention is to provide an improved anti-icing additive suitable for use in a liquid hydrocarbon fuel. Another object of this invention is to provide an improved liquid hydrocarbon fuel having an improved anti-icing additive incorporated therein. Another object of this invention is to provide a method of operating a jet engine using said liquid hydrocarbon fuel having said improved anti-icing additive incorporated therein. Another object of this invention is to provide a method for the prevention of the formation of ice crystals and/or other deposits in the fuel system of a continuous combustion power plant, which power plant is being operated at low temperatures. Another object of this invention is to provide a method for preventing the plugging of filters, orifices, valves, and other points of restricted flow in the fuel system of a continuous combustion type power plant by ice crystals or deposits of other materials. Other aspects, objects, and advantages of the invention will be apparent to those skilled in the art in view of this disclosure.

Thus, according to the invention, there is provided an essentially neutralized anti-icing additive having a pH within the range of 6 to 7, suitable for use in a liquid hydrocarbon fuel, consisting essentially of: a glycol ether having the formula $R(OCH_2CH_2)_xOH$ wherein R is selected from the group consisting of a hydrogen atom, methyl, ethyl, propyl, butyl, phenyl, and tolyl groups, when R is hydrogen, $x$ is an integer of from 2 to 4, and when R is other than hydrogen, $x$ is an integer of from 1 to 4; or, consisting essentially of a blend in synergistic proportions of (1) a glycol ether according to said formula, and (2) a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1.

According to one embodiment of the invention, the neutralization of the anti-icing additive is effected by incorporating in the glycol ether additive per se, the blended additive per se, or the offending component of said blended additive prior to blending, sufficient to a suitable neutralizing agent to maintain the pH thereof between 6 and 7. Another embodiment of the invention comprises contacting the glycol ether additive per se, the blended additive per se, or the offending component of said blended additive prior to blending, with a suitable selective adsorbent to selectively adsorb the material or materials responsible for the pH being outside the desired range of 6 to 7. By thus providing an essentially neutralized additive having a pH within the range of 6 to 7 and insuring that the additive itself does not contribute to the basicity or acidity of the fuel blend containing same or the water phase associated therewith, the present invention is an improvement over the invention of said copending application Serial No. 146,443, now U.S. Patent No. 3,032,971, and the invention of said Patent 2,952,121.

Obviously, the amount of neutralizing agent to be used in the practice of the invention will depend upon the pH of the additive or additive component being neutralized, the nature of the contaminating material or materials responsible for the pH being outside the range of 6 to 7, and the specific neutralizing agent used. Thus, the invention is not limited to using any specific amounts of neutralizing agent. In all cases the amount of neutralizing agent used will be a small but effective amount sufficient to adjust the pH of the additive or additive component to a value within the range of 6 to 7. By way of example only, an additive or additive component having a low pH in the order of 3 to 5.5 or lower can usually be essentially neutralized, i.e., the pH increased to within the range of 6 to 7 by the addition thereto of from 0.5 to 10 cc. per gallon of a 20 weight percent aqueous solution of sodium hydroxide. Similarly, by way of example only, an additive component having a high pH in the order of 7.5 to 10 or higher can usually be essentially neutralized by the addition thereto of from 0.5 to 10 cc. per gallon of a 20 weight percent aqueous solution of acetic acid.

Further according to the invention, there is provided a liquid hydrocarbon fuel having one of said essentially neutralized anti-icing additives incorporated therein in a small but effective amount. When using said combination glycol ether-polyhydroxy alcohol additive the amount incorporated in said fuel is within the range of from 0.01 to 1, preferably 0.01 to 0.5, more preferably 0.05 to 0.2 volume percent of said fuel. The amount of 0.1 volume percent gives excellent results. When using the glycol ether additive the amount incorporated in said fuel is from 0.01 to 3, preferably 0.01 to 1.5 volume percent of said fuel.

Still further according to the invention, there is provided a method of operating a jet engine which comprises passing a liquid hydrocarbon fuel containing a small but effective amount of an essentially neutralized anti-icing additive of the invention through the fuel supply system of said engine to a combustion zone of said engine, and burning said fuel.

As discussed in said copending application, it was surprising and unexpected that a synergistic effect is obtained when said saturated acyclic polyhydric alcohol is used in combination with said glycol ether. Said synergistic effect is also obtained in the essentially neutralized anti-icing additives of the present invention.

In said combination glycol ether-polyhydroxy alcohol additive, a minor amount of said alcohol is employed in combination with a major amount of said ether. Suitable proportions for said alcohol and said ether in the anti-icing additive are usually from 0.5 to 50 weight percent of the said alcohol and from 99.5 to 50 weight percent of said ether. A presently more preferred range is from 1 to 40 weight percent of said alcohol and from 99 to 60 weight percent of said ether. A still more preferred range is from 1 to 10 weight percent of said alcohol and 99 to 90 weight percent of said ether. In all instances the amount of said alcohol used in the combination anti-icing additives of the invention is an amount sufficient to synergistically increase the anti-icing properties of the additive when it is added to said fuel.

Examples of saturated acyclic polyhydroxy alcohols which can be used in the practice of the invention include the following: 1,2-dihydroxypropane; 1,3-dihydroxypropane; glycerol; 1,2,3-trihydroxybutane; 1,2,4-trihydroxybutane; 2-(hydroxymethyl)-1,3-dihydroxypropane; erythritol; pentaerythritol; 1,2,3,4 - tetrahydroxypentane; 1,2,3,5-tetrahydroxypentane; 1,2,4,5-tetrahydroxypentane; 2-(hydroxymethyl)-1,3,4-trihydroxybutane; and 1,2,3,4,5-pentahydroxypentane.

A presently preferred group of polyhydroxy alcohols are: glycerol; 1,2,3-trihydroxybutane; 1,2,4-trihydroxybutane; and erythritol. Glycerol is the presently most preferred polyhydroxy alcohol.

Examples of said glycol ethers which can be used in the practice of the invention include, among others, the following: methyl ether of ethylene glycol (methyl cellosolve); ethyl ether of ethylene glycol (ethyl cellosolve); butyl ether of ethylene glycol (butyl cellosolve); methyl ether of diethylene glycol (methyl carbitol); ethyl ether of diethylene glycol (ethyl carbitol); butyl ether of diethylene glycol (butyl carbitol); methyl ether of triethylene glycol; ethyl ether of triethylene glycol; phenyl ether of ethylene glycol; tolyl ether of ethylene glycol; phenyl ether of diethylene glycol; tolyl ether of diethylene glycol; phenyl ether of triethylene glycol; tolyl ether of triethylene glycol; diethylene glycol; triethylene glycol; and tetraethylene glycol.

A presently preferred group of glycol ethers suitable for use in the practice of the invention are those having the formula $R(OCH_2CH_2)_xOH$ wherein: R is selected from the group consisting of methyl, ethyl, propyl, and butyl groups, and $x$ is an integer of from 1 to 4. The most preferred glycol ethers are those of the above formula wherein R is methyl or ethyl and $x$ is 1 or 2.

A suitable basic acting neutralizing agent for use in the practice of the invention when it is desired to increase to or maintain the pH of either the glycol ether additive or the blended glycol ether-polyhydroxy alcohol additive, or one of the components of said blended additive, within the range of 6 to 7, is any agent which has a pH value in excess of 7 when dispersed in water, or which reacts as a base in the presence of acid-acting materials and thereby removes acidic properties of said materials. A suitable acidic-acting neutralizing agent for use in the practice of the invention when it is desired to decrease to or maintain the pH of either the glycol ether additive or the blended glycol ether-polyhydroxy alcohol additive, or one of the components of said blended additive, within the range of 6 to 7, is any agent which has a pH value of less than 7 when dispersed in water, or which reacts as an acid in the presence of basic-acting materials and thereby removes basic properties of said materials. Thus, a suitable neutralizing agent, either basic-acting or acidic-acting, can be an organic or an inorganic material; and the invention is not limited to any specific neutralizing agents. Since buffer substances or systems act to control hydrogen ion and hydroxyl ion concentration over certain ranges of the pH scale, thereby maintaining a constant pH in a given system where they are employed, those buffering substances or systems which maintain the pH of the system in which they are employed near the point of neutrality can be considered as neutralizing agents. Thus, as indicated above, the term "neutralizing agent" is used generically herein and in the claims, unless otherwise specified, and includes buffer substances which will adjust or maintain the pH of the system in which they are used within the range of 6 to 7.

As a general rule, organic neutralizing agents are preferred over inorganic neutralizing agents because said organic agents yield gaseous products of combustion and there is less tendency for the deposition of combustion products in the combustion chamber of the engine. Inorganic neutralizing agents such as ammonium hydroxide which yield gaseous products of combustion are included in the preferred group. However, the amount of neutralizing agent utilized in the practice of the invention is usually so small that deposition of combustion products presents no problem. It is not necessary that the neutralizing agents used in the practice of the invention have a high degree of solubility in water. The small amount of neutralizing agent used in most instances makes it possible to use many compounds or materials which are normally considered insoluble in water. Furthermore, since there is some partitioning of the additive between the fuel phase and the water phase, and some additive is always present in the water phase, the presence of the glycol ether imparts solubility to many materials which are not otherwise considered soluble in water.

Examples of organic basic-acting neutralizing agents which can be used in the practice of the invention include, among others, the following: primary amines such as isopropylamine, 2-amino-butane, propylamine, ethanolamine, 2-amino-4-methyl-pentane, and various amyl, hexyl, octyl, and other homologous primary amines, secondary amines such as dimethyl amine, diethyl amine, di-n-propylamine, diisopropylamine, dibutylamines, diethanolamine, and various secondary amines derived from amyl, hexyl, heptyl, octyl, and other homologous alkyl groups such as di-n-laurylamine, methylisobutylamine, etc.; tertiary amines such as triethanolamine, tri-n-propylamine, triisopropylamine, tributylamine, tertiary amine type derivatives of alkyl amine diamines, etc.; quaternary ammonium bases such as tetramethyl and higher tetra-alkylammonium bases, and trimethylbenzyl, trimethylcyclohexyl, and tributyldecylammonium bases, etc.; and other organic bases.

Examples of inorganic basic-acting neutralizing agents which can be used in the practice of the invention include, among others, the following: ammonium hydroxide; the alkali metal hydroxides such as sodium hydroxide, potassium hydroxide, lithium hydroxide, etc.; and others.

Examples of organic acidic-acting neutralizing agents which can be used in the practice of the invention include, among others, the following: the lower carboxylic acids such as formic acid, acetic acid, propionic acid, butyric acid, and valeric acid; dicarboxylic acids such as oxalic acid, malonic acid, succinic acid, glutaric acid, adipic acid, and pimelic acid; benzoic acid, mono, di, and trichloro acetic acids; other halogenated acetic acids; other halogenated carboxylic and dicarboxylic acids; and others.

Examples of inorganic acidic-acting neutralizing agents which can be used in the practice of the invention include, among others, the following: hydrochloric acid, nitric acid, sulfuric acid, phosphoric acid, etc.

Examples of buffer substances which can be used in the practice of the invention include any substance or mixture of substances which will act to adjust or maintain the pH of the system in which it is used within the range of 6 to 7. One example of such a system is McIlvaines standard buffer solutions consisting of stock solution A (0.1 molar citric acid ($C_6H_8O_7$) solution), and stock solution B (0.2 molar disodium phosphate ($Na_2HPO_4$) solution). Said solutions A and B when mixed in ratios of 7.37 to 3.53 cc. of solution A to 12.63 to 16.47 cc. of solution B to give a total volume of 20 cc., will produce buffer solutions having a pH in the range of 6 to 7. Other examples of suitable buffer systems are: a mixture of approximately 0.1 molar potassium acid phosphate solution and approximately 0.1 molar disodium phosphate solutions in suitable ratios to give a pH between 6 and 7; and a mixture of approximately 0.1 molar potassium acid phosphate and approximately 0.1 molar sodium hydroxide solutions in suitable ratios to give a pH between 6 and 7. More concentrated solutions of the above solutions can be used so long as the pH of the buffer system thereby produced is not outside the range of 6 to 7.

The following examples will serve to further illustrate the invention.

EXAMPLE I

In the engine fuel supply system of a jet aircraft the points which most frequently plug due to ice formation are the fuel filters. Thus the filter plugging characteristics of a jet engine fuel containing an anti-icing additive are a good measure of the effectiveness of said additive as an anti-icing agent.

The filter plugging characteristics of a jet-engine fuel are tested by a procedure and employing apparatus designed particularly for this purpose. The apparatus consists essentially of a fuel reservoir system designed to supply the fuel at a constant rate to an enclosed filter cell element immersed in a constant temperature bath. Said filter cell is provided with an inlet positioned above an outlet having an effective area of 1.0 square centimeter. The filter used across said outlet is a 10-micron filter paper. If desired, stainless steel filters of 200–300 mesh can be used instead of said filter paper. It has been found that using said 10-micron paper affords a more severe test than said 200-mesh screen. A manometer is provided to measure the pressure drop across the filter.

The fuel to be tested is admitted to the filter cell element through a copper coil so constructed that said coil and said cell element can be completely immersed in said constant temperature bath. Said coil provides for quick chilling of the fuel to the desired predetermined temperature. A thermocouple is provided for measuring the temperature of the fuel entering the filter cell. When the temperature of the cooling medium in the constant temperature bath has reached the desired predetermined temperature the flow of fuel to be tested is started. The filtrate is received in a graduated cylinder and pressure drop readings are taken for each 10 milliliters filtered so that a curve relating pressure drop across the filter and volume filtered can be plotted. A test is completed by filtering 1000 ml. of sample or reaching a pressure drop across the filter of 260 mm. of mercury (approximately 5 pounds), whichever occurs first. In this test method the filter can be considered to be plugged when the pressure drop reaches 260 mm. of mercury.

Filtration tests at −40° F. were conducted employing the jet fuel described hereinafter and which had been saturated with water at 75° F., and said water saturated jet fuel to which had been added various anti-icing additives. The results of said tests are set forth in Table I below.

Table I

| Run No. | Additive Concentration, Vol. Percent | Additive Composition, Wt. Percent | | Volume Filtered, ml. | Pressure Drop, mm. Hg |
|---|---|---|---|---|---|
| | | Ethylene Glycol Monomethyl ether | Glycerol | | |
| 1 | 0.0 | | | 139 | |
| 2 | 0.025 | 100 | | 850 | 260 |
| 3 | 0.025 | | 100 | 390 | 260 |
| 4 | 0.025 | 90 | 10 | 1,000 | 100 |
| 5 | 0.025 | 75 | 25 | 1,000 | 68 |
| 6 | 0.025 | 50 | 50 | 1,000 | 42 |
| 7 | 0.010 | 100 | | 592 | 260 |
| 8 | 0.010 | | 100 | 282 | 260 |
| 9 | 0.010 | 90 | 10 | 789 | 260 |
| 10 | 0.010 | 98 | 2 | 958 | 260 |
| 11 | 0.010 | 99 | 1 | 1,000 | 218 |

It is apparent from the above data that a synergistic effect is obtained when ethylene glycol monomethyl ether and glycerol are used in combination as an anti-icing additive. A comparison of Runs 4, 5, and 6 with Runs 2 and 3 shows that the blends of ethylene glycol monomethyl ether and glycerol are superior to either the ethylene glycol monomethyl ether alone or the glycerol alone, all additives being tested at the same concentration.

A comparison of Runs 7, 8, and 9 shows that even though the maximum pressure drop was reached in all three runs, the amount filtered in Run No. 9 is much greater when using the combination additive of the invention than when using either of the individual component additives alone as in Runs 7 and 8. All additives were again tested at the same concentration and the results again clearly show the unexpected synergistic effect obtained when using the combination additive.

EXAMPLE II

Actual flight tests in a B-52 jet aircraft have demonstrated the practical value of the anti-icing additives of the invention. In these tests the basic flight test procedure was to fly the aircraft at an altitude of 40,000 to 45,000 feet until the bulk fuel temperature in the fuel tanks had decreased to −20° F. or lower. Six flight tests of an average duration of 10 to 12 hours were made.

In three of said tests the No. 1 engine was not protected by a heater in the fuel system and was supplied from No. 1 main tank with JP-4 fuel containing approximately 100 parts per million of water. Engine Nos. 2, 3, and 4 were protected by fuel system heaters and were supplied from No. 2 main tank with JP-4 fuel containing approximately 100 parts per million of water. The remaining four engines, Nos. 5, 6, 7, and 8, were not protected with fuel system heaters. Engines Nos. 5 and 6 were supplied from No. 3 main fuel tank with JP-4 fuel containing approximately 100 parts per million of water and also containing 0.1 volume percent of an anti-icing additive consisting essentially of a blend of about 90 weight percent ethylene glycol monomethyl ether with about 10 weight percent glycerol, and having a pH within the range of 6 to 7. Engines Nos. 7 and 8 were supplied from No. 4 main tank with JP-4 fuel containing approximately 100 parts per million of water and also containing 0.1 volume percent of an anti-icing additive consisting essentially of a blend of about 90 weight percent diethylene glycol monomethyl ether with about 10 weight percent glycerol, and having a pH within the range of 6 to 7.

In the remaining three flight tests the test conditions were the same as said first three flight tests except that the fuel in main tanks 1, 3 and 4 had excess water in the amount of 2 milliliters per gallon added thereto.

Repeated fuel flow interruptions and flame-outs were experienced on No. 1 engine throughout said flight tests. The remainder of the engines functioned in normal manner. After each flight the fuel system screens were removed immediately upon landing. Ice was found on said screens and it was established that fuel system ice was responsible for the failures of No. 1 engine. No ice was found in the fuel systems of the other engines.

No deposits, other than ice, as described above, were observed in the fuel system of the aircraft.

It was also found that the water drain valves on main fuel tanks 1 and 2 (fuel contained no additive) were frozen whereas the drain valves on main fuel tanks 3 and 4 (fuel contained additive) were free and clear.

EXAMPLE III

In other flight tests carried out in a manner essentially like that described in Example II above, there was encountered a sluggishness in the response of some engines to the fuel controls. It was established beyond question that this malfunctioning was not due to ice formation. Examination of the fuel control units after termination of the flight tests revealed the presence of deposits in low flow areas of the fuel system components. Samples of said deposits were examined microscopically and the major portion of the solid constituent was found to be ferric oxide particles having a diameter of less than 10 microns. Spectrographic analysis of a sample of the deposits confirmed the presence of ferric oxide and also indicated the presence of silica as silicon dioxide.

Iron deposits of the above-described general nature, with the accompanying fuel control unit malfunctioning, have been noted in the fuel control units of jet engines operated on fuels which did not contain either the above-described glycol ether anti-icing additive or the combination glycol ether-polyhydroxy alcohol anti-icing additive. It is thus clear that said anti-icing additives per se are not responsibe for said deposits. As part of an investigation to determine the cause of said deposits it was discovered that pH of the aqueous phase associated with the fuel in fuel tanks (both ground and aircraft) is a major factor in causing said deposits and malfunctioning of fuel control units.

EXAMPLE IV

In numerous flight tests carried out in a manner essentially like that of Example II above, and wherein the pH of the additive is maintained within the range of 6 to 7, it is found that fuel control unit malfunctioning is eliminated. Upon examination of fuel control units after termination of said flight tests, it is found that the deposits therein are markedly reduced as compared to those described above, or are completely absent.

EXAMPLE V

A sample of anti-icing additive consisting essentially of the methyl ether of ethylene glycol and having a pH of 4.0 was neutralized by the addition thereto of aqueous sodium hydroxide. It was found that the addition of 20 percent by weight aqueous solution of sodium hydroxide at a rate of 5 cc. per gallon increased the pH of said additive to 6.8.

EXAMPLE VI

A sample of an anti-icing additive consisting essentially of a blend of about 90 volume percent ethylene glycol monomethyl ether and about 10 volume percent of glycerol and having a pH of 10 was neutralized by the addition thereto of aqueous acetic acid. It was found that the addition of 20 percent by weight aqueous solution of acetic acid at a rate of 0.9 cc. per gallon decreased the pH of said blended additive of 6.8.

As mentioned above, the pH of the anti-icing additives can be adjusted to be essentially neutral (pH in the range of 6 to 7) by contacting same with a suitable selective adsorbent to selectively adsorb the materials responsible for the high or low pH. The contacting can be carried out in any suitable manner and many suitable methods for carrying out the contacting of a liquid with an adsorbent are known to the art. For example, one of the simplest methods merely involves passing the liquid over a fixed bed of the adsorbent. Another method comprises forming a slurry of the finely divided adsorbent in the liquid and then separating the adsorbent from the contacted liquid by settling and decanting, filtering or other suitable manner. In the case of the combination glycol ether-polyhydroxy alcohol additive, such contacting can be carried out on the blended additive or on either component thereof.

Any suitable contacting rate, depending upon the amount of impurity to be removed and the particular adsorbent utilized, can be employed. For example, in fixed bed operations contacting rates in the order of 0.1 to 10 volumes of liquid per volume of adsorbent per minute, more usually in the order of about 1 volume of liquid per volume of adsorbent per minute, can be employed. In slurry operations the liquid can be contacted with from 0.01 to 1 pound, more usually about 0.1 pound, of adsorbent per gallon of liquid.

Any suitable selective adsorbent can be employed for said contacting operations. Examples of suitable adsorbents include, among others, the following: various activated clays such as attapulgus clay; fuller's earth; bauxite; activated alumina; activated carbons; silica gel; active magnesium oxide; and the like.

As used herein and in the claims, unless otherwise specified, the term "pH," when employed in connection with an additive composition of the invention, refers to a pH value which has been determined at 25° C. by means of a standard pH meter employing a glass electrode and a calomel electrode, on a 25 ml. sample of the additive diluted to 100 ml. with carbon dioxide-free distilled water.

The JP-4 fuel used in the above Example I had the following physical properties:

| | |
|---|---|
| Reid Vapor Pressure | 2.20 |
| A.P.I. Gravity | 53.5 |
| Distillation, (° F.): | |
| I.B.P. | 138 |
| 5% | 220 |
| 10% | 251 |
| 15% | 268 |
| 20% | 278 |
| 30% | 300 |
| 40% | 319 |
| 50% | 326 |
| 60% | 347 |
| 70% | 363 |
| 80% | 383 |
| 90% | 417 |
| 95% | 445 |
| EP | 473 |
| Rec | 99 |
| Res | 1 |

Said fuel complied fully with all other specifications for a JP-4 jet fuel, including the freezing point specification maximum of −76° F. As is known to those skilled in the art, this freezing point specification is provided to insure that plugging of the fuel system will not occur due to freezing of the fuel itself at the low temperatures existing at the high altitudes at which jet aircraft operate.

Any suitable type of hydrocarbon fuel can be employed in the practice of the invention. Said fuels which can be so employed included the conventional jet engine fuels which comprise a blend of hydrocarbons boiling in the range from about 100 to about 700° F., such as gas oils, kerosene, and gasolines, including aviation gasoline. Fuels of the paraffin and naphthenic type having relatively low aromatic content, i.e., not more than about 20 liquid volume percent aromatics, as well as fuels of the aromatic type having high aromatic contents ranging from about 20 up to about 88 percent or higher liquid volume percent aromatics, can be used in operating continuous combustion turbo type aircraft engines according to the practice of the invention. Hydrocarbon fuels having wide boiling range, such as JP-3, JP-4, or fuels of the kerosene type, such as JP-5, can be employed, the boiling range of these fuels generally being in the range of about 200 to about 600° F.

Thus, while the invention has been described herein with particular reference to jet engine fuels, more specifically JP-4 jet engine fuel, the invention is not limited thereto. The invention can be used with all grades of jet engine fuels. The anti-icing additive of the invention can also be used with advantage in gasolines for reciprocating engines and in diesel fuels for compression-ignition engines.

The hydrocarbon fuel compositions of the invention containing an anti-icing additive of the invention may also contain commonly used other additives such as anti-corrosion agents, oxidation inhibitors, and the like.

As used herein and in the claims, unless otherwise specified, the terms "jet engine" and "jet engine fuel" refer to and include turbo-prop, turbo-jet ramjet and pulse jet engines, and fuels designed to be used in said engines.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In the method of operating a jet engine which encounters subfreezing temperatures, said engine being equipped with a fuel supply system through which a liquid hydrocarbon fuel is passed to a combustion zone of said engine, said fuel supply system is subject to becoming plugged by ice formation at said subfreezing temperatures due to the presence of water in said fuel, and to prevent said plugging there is incorporated in said fuel from 0.01 to 3 volume percent of an anti-icing additive consisting essentially of a glycol ether having the formula $R(OCH_2CH_2)_xOH$ wherein R is selected from the group consisting of a hydrogen atom, methyl, ethyl, propyl, butyl, phenyl, and tolyl groups, when R is hydrogen x is an integer of from 2 to 4, and when R is other than hydrogen, x is an integer of from 1 to 4, and where in said method and in those instances when said additive as prepared has a pH outside the range of from 6 to 7 which can contribute to other malfunctioning of said fuel supply system and said engine, the improvement of: adjusting the pH of said additive from a value outside the range of 6 to 7 to a value within the range of from 6 to 7 prior to incorporating said additive in said fuel.

2. A method according to claim 1 wherein said glycol ether is ethylene glycol monomethyl ether and is present in said liquid hydrocarbon fuel in an amount within the range of 0.01 to 1.5 volume percent of said fuel.

3. A method according to claim 1 wherein said glycol ether is diethylene glycol monomethyl ether and is present in said liquid hydrocarbon fuel in an amount within the range of 0.01 to 1.5 volume percent of said fuel.

4. In the method of operating a jet engine which encounters subfreezing temperatures, said engine being equipped with a fuel supply system through which a liquid hydrocarbon fuel is passed to a combustion zone of said engine, said fuel supply system is subject to becoming plugged by ice formation at said subfreezing temperatures due to the presence of water in said fuel, and to prevent said plugging there is incorporated in said fuel from 0.01 to 1 volume percent of an anti-icing additive consisting essentially of (1) from 99.5 to 50 weight percent of a glycol ether having the formula $$R(OCH_2CH_2)_xOH$$

wherein R is selected from the group consisting of a hydrogen atom, methyl, ethyl, propyl, butyl, phenyl, and tolyl groups, when R is hydrogen x is an integer of from 2 to 4, and when R is other than hydrogen, x is an integer of from 1 to 4, and (2) from 0.5 to 50 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1, and where in said method and in those instances when said additive as prepared has a pH outside the range of from 6 to 7 which can contribute to other malfunctioning of said fuel supply system and said engine, the improvement of: adjusting the pH of said additive from a value outside the range of 6 to 7 to a value within the range of from 6 to 7 prior to incorporating said additive in said fuel.

5. A method according to claim 4 wherein said anti-icing additive consists essentially of glycerol and ethylene glycol monomethyl ether, and is present in said liquid hydrocarbon fuel in an amount within the range of from 0.05 to 0.2 volume percent of said fuel.

6. A method according to claim 4 wherein said anti-icing additive consists essentially of glycerol and diethylene glycol monomethyl ether, and is present in said liquid hydrocarbon fuel in an amount within the range of 0.05 to 0.2 volume percent of said fuel.

7. A method according to claim 4 wherein said anti-icing additive consists essentially of glycerol and ethylene glycol monomethyl ether, and is present in said liquid hydrocarbon fuel in an amount within the range of from 0.01 to 1 volume percent of said fuel.

8. A method according to claim 4 wherein said anti-icing additive consists essentially of glycerol and diethylene glycol monomethyl ether, and is present in said liquid hydrocarbon fuel in a amount within the range of from 0.01 to 1 volume percent of said fuel.

References Cited by the Examiner

UNITED STATES PATENTS 2,952,121  9/1960  Mitacek _____ 44—56
3,032,971  5/1962  Shotton _____ 44—77 X

OTHER REFERENCES

"Ethers & Oxides" Bulletin of Carbide & Carbon Chemicals Corp., March 1, 1949, pp. 12 to 14.

Perry: "Chemical Engineers Handbook," p. 889, publ. by Maple Press Co., York, Pa., 1950, third edition.

"Synthetic Organic Chemicals" Bulletin of Carbide & Carbon Chemicals Corp., August 15, 1934, pp. 22–27.

U.S.P. 1960, pp. 554–555, publ. by Mack Printing Co., Easton, Pa.

DANIEL E. WYMAN, *Primary Examiner.*

M. WEINBLATT, C. O. THOMAS, J. E. DEMPSEY, YVONNE M. HARRIS, *Assistant Examiners.*